No. 700,247. Patented May 20, 1902.
J. SCOTT.
ROTARY PLOW.
(Application filed Jan. 7, 1902.)
(No Model.)

Witnesses

Inventor
John Scott

UNITED STATES PATENT OFFICE.

JOHN SCOTT, OF EDINBURGH, SCOTLAND.

ROTARY PLOW.

SPECIFICATION forming part of Letters Patent No. 700,247, dated May 20, 1902.

Application filed January 7, 1902. Serial No. 88,794. (No model.)

*To all whom it may concern:*

Be it known that I, JOHN SCOTT, a citizen of the United Kingdom of Great Britain and Ireland, residing at 37 Willowbrae avenue, Edinburgh, Scotland, have invented a certain new and useful Rotary Plow, (for which application for patent has been made in Great Britain, No. 4,275, dated February 28, 1901,) of which the following is a specification.

This invention relates to cultivating apparatus of the kind described in the specification of British Letters Patent No. 29,997 of 1897, in which the operating mechanism and cutters are carried by a motor-vehicle; and it has for its object to adapt such apparatus for dealing with fallow or grass land by providing them with devices for cutting into and turning over the land after the fashion of a plow.

The invention is illustrated by the accompanying drawings, in which—

Figure 1:
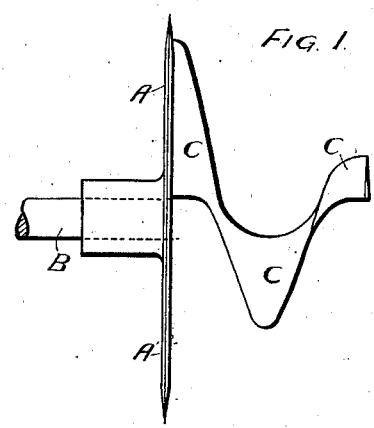
Figure 2:
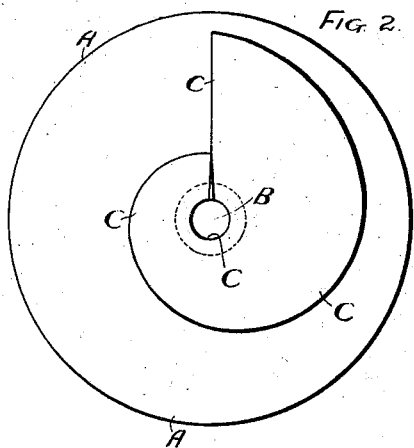
Figure 3:
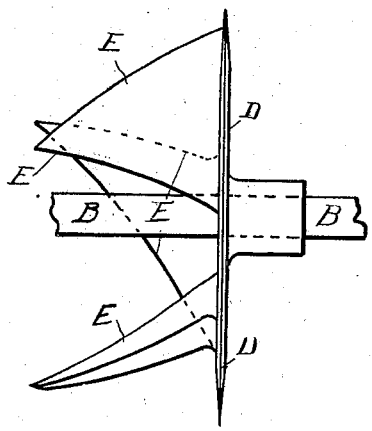
Figure 4:
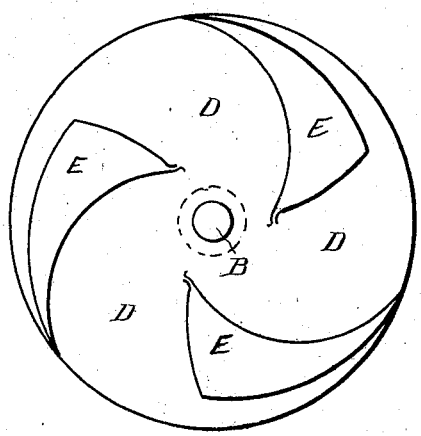

Figure 1 is a longitudinal elevation, and Fig. 2 an end view, of one modification of the rotary plow. Fig. 3 is a longitudinal elevation of the modified form of the plow. Fig. 4 is an end view of the plow shown in Fig. 3.

The plowing tool or device illustrated by Figs. 1 and 2 is composed of a cutting-disk A, secured upon a rotating shaft B and having at one side of the disk A a helical or screw blade C, preferably tapering toward its outer or free end, so that the helix is of less diameter at that end, and which blade may be formed upon the shaft as a central core or with an open center, as shown. The shaft B, in practice is mounted so as to extend transversely of the direction of travel, and the disk A, whose periphery is sharp and enters the ground, serving as a colter or guide, while the lower edges of the helical blade C also enter the ground, and by the rotation of the latter the soil is turned over as the disk and helical blades travel forward with the vehicle.

In the modification illustrated by Figs. 3 and 4 the disk D is formed with a number of radial or curved and inclined blades E, disposed around the axis of rotation and sloping from the face of each disk D in such wise that these blades act as moldboards and turn over the soil.

In practice the helical or other blades or disks are preferably driven at a higher speed than that due to the forward motion of the vehicle and preferably in the opposite direction to that of the carrying-wheels.

Having now described my invention, what I claim, and desire to secure by Letters Patent, is—

1. A device of the class described comprising a disk having a helically-bent blade projecting from one face thereof and tapered in the direction of its outer end.

2. A device of the class described comprising a disk having a helically-bent blade projecting from one face thereof and continuously tapered in the direction of its outer end.

3. A device of the class described comprising a central supporting-disk having a beveled cutting edge and a blade projecting laterally therefrom, said blade being bent into helical form of changing radius.

4. A device of the class described comprising a supporting-disk having a beveled cutting edge, said disk having a blade projecting therefrom, said blade being bent to form a helix of gradually-decreasing radius.

5. A device of the class described comprising a supporting-disk having a beveled cutting edge, said disk having a tapered blade projecting therefrom, said blade being bent to form a helix of gradually-decreasing radius.

In witness whereof I have hereunto set my hand in presence of two witnesses.

JOHN SCOTT.

Witnesses:
WALLACE FAIRWEATHER,
JNO. ARMSTRONG, Jr.